United States Patent
Blum et al.

(10) Patent No.: US 7,422,809 B2
(45) Date of Patent: Sep. 9, 2008

(54) METHOD AND APPARATUS FOR REGULATING ELECTRICAL POWER OUTPUT OF A FUEL CELL SYSTEM

(75) Inventors: Joachim Blum, Stuttgart (DE); Josef Sonntag, Kirchheim (DE); Manfred Strohmaier, Ohmden (DE)

(73) Assignee: NuCellSys GmbH, Kirchheim/Teck-Nabern (DE)

( * ) Notice: Subject to any disclaimer, the term of this patent is extended or adjusted under 35 U.S.C. 154(b) by 613 days.

(21) Appl. No.: 10/486,435

(22) PCT Filed: Aug. 19, 2002

(86) PCT No.: PCT/EP02/09249

§ 371 (c)(1),
(2), (4) Date: Aug. 24, 2004

(87) PCT Pub. No.: WO03/017403

PCT Pub. Date: Feb. 27, 2003

(65) Prior Publication Data

US 2005/0008905 A1   Jan. 13, 2005

(30) Foreign Application Priority Data

Aug. 18, 2001   (DE) ................................ 101 40 603

(51) Int. Cl.
*H01M 8/04*   (2006.01)
*H01M 8/06*   (2006.01)
(52) U.S. Cl. ............................... 429/17; 429/19; 429/22
(58) Field of Classification Search .................. 429/17, 429/19, 22, 23, 24, 25
See application file for complete search history.

(56) References Cited

U.S. PATENT DOCUMENTS

| 5,432,710 A | 7/1995 | Ishimaru et al. ............. 364/493 |
| 5,658,681 A * | 8/1997 | Sato et al. ................. 429/22 X |
| 2002/0114986 A1* | 8/2002 | Aoyagi et al. ................. 429/23 |

FOREIGN PATENT DOCUMENTS

| DE | 199 56 225 A1 | 5/2000 |
| DE | 100 02 006 A1 | 8/2001 |
| EP | 1 139 475 A2 | 10/2001 |
| EP | 1 207 578 A2 | 5/2002 |
| JP | 59-111273 | 6/1984 |
| JP | 62-61954 | 3/1987 |
| JP | 59-111270 | 6/1987 |
| JP | 63-45763 | 2/1988 |

* cited by examiner

*Primary Examiner*—Stephen J. Kalafut
(74) *Attorney, Agent, or Firm*—Crowell & Moring LLP

(57) ABSTRACT

A method and apparatus are provided for regulating electrical power output of a fuel cell system comprising a fuel processing system, a system for supplying an oxidant stream, and a fuel cell to supply power. In a reformer of the fuel processing system a supply fuel is used to produce hydrogen-rich gas to be supplied to the fuel cell. The fuel cell system also contains a controller to set the mass flow of the supply fuel to the fuel processing system and the mass flow of the oxidant stream to the fuel cell, whereby the mass flow of the oxidant stream can be set in dependence on the dynamic response of the fuel processing system and/or the mass flow of the hydrogen-rich gas can be set in dependence on the dynamic response of the system for supplying the oxidant stream.

9 Claims, 3 Drawing Sheets

METHOD AND APPARATUS FOR REGULATING ELECTRICAL POWER OUTPUT OF A FUEL CELL SYSTEM

BACKGROUND

1. Field of Invention

The invention relates to a method and apparatus for regulating electrical power output of a fuel cell system.

2. Description of the Related Art

U.S. Pat. No. 5,432,710 A describes a power supply system that contains a fuel cell and a controller. The controller regulates the systems and subsystems of the power supply system by minimizing a cost function in the form of an algebraic equation. This cost function takes into account the power demand of the load, the power demand of the system itself, and the exhaust gases. In dependence on the cost function, the controller sets the mass flow of an oxidant stream and the mass flow of a hydrogen-rich gas for the fuel cell unit, and the mass flow of a fuel for the reformer.

JP 59-11270 describes a fuel cell system comprising differential pressure controlling valves for controlling a differential pressure between the pressures of supplied oxygen and hydrogen. The hydrogen is supplied from a hydrogen tank. The differential pressure control valves are connected to each other by a link mechanism. Thus, the operation of one pressure control valve is controlled in dependence on the operation of the respective other differential pressure control valve.

JP 5911273 describes a similar fuel cell system with two pressure control valves which are controlled in dependence from the respective other pressure control valve.

EP 1 207 578 A2, which is not prepublished, describes a fuel cell system wherein the hydrogen is supplied from a high pressure hydrogen tank to the fuel cell system. In this document it is mentioned that pressure hydrogen supplied from the high pressure hydrogen tank to the fuel cell is based on the air pressure supplied from the air supply side. That means that the pressure of the hydrogen supplied to the fuel cell system is controlled in dependence on the air pressure supply from the air supply side.

There is a need for improvement in regulating power supply from a fuel cell to a load. The present invention addresses this need and provides further related advantages.

BRIEF SUMMARY OF THE INVENTION

The invention provides a method of operating a fuel cell system with the features according to claim 1. The fuel cell system comprises a fuel cell with an anode stream passage and a cathode stream passage, an anode supply system for supplying a hydrogen-rich gas to the anode stream passage, a cathode supply system for supplying an oxidant stream to the cathode stream passage and a controller for operating the anode and cathode supply systems.

The method comprises operating one supply system in dependence on the dynamic response of the other supply system. The hydrogen-rich gas mass flow to the anode stream passage may be set in dependence on the dynamic response of the cathode supply system and/or the oxidant stream mass flow to the cathode stream passage may be set in dependence on the dynamic response of the anode supply system.

The invention also provides a method of operating a fuel cell comprising a fuel processing system for converting a supply fuel into a hydrogen-rich gas. In such an embodiment, the supply fuel mass flow to the fuel processing system may be set in dependence on the dynamic response of the cathode supply system and/or the oxidant stream mass flow to the cathode stream passage may be set in dependence on the dynamic response of the fuel processing system.

In a further embodiment, the supply fuel mass flow to the fuel processing system may be set in dependence on the efficiency of the fuel processing system.

In a still further embodiment, the supply fuel mass flow to the fuel processing system may be set in dependence on the intrinsic consumption of hydrogen-rich gas In the fuel processing system.

The Invention also provides a fuel cell system with the features according to claim 7. The fuel cell system comprises:
a) a fuel cell comprising an anode stream passage and a cathode stream passage;
b) an anode supply system for supplying a hydrogen-rich gas to the anode stream passage;
c) a cathode supply system for supplying an oxidant stream to the cathode stream passage;
d) a controller for operating one supply system in dependence on the dynamic response of the other supply system.

The anode supply system may comprise a fuel processing system for converting a supply fuel into a hydrogen-rich gas.

Pursuant to the invention, the controller may set the hydrogen-rich gas mass flow to the anode stream passage in dependence on the dynamic response of the cathode supply system. Alternatively, the controller may set the supply fuel mass flow to the fuel processing system in dependence on the dynamic response of the cathode supply system.

In an alternative embodiment, the controller may set the oxidant stream mass flow to the cathode stream passage in dependence on the dynamic response of the anode supply system or in dependence on the dynamic response of the fuel processing system.

In a further alternative embodiment, the controller may set the supply fuel mass flow to the fuel processing system in dependence on the efficiency of the fuel processing system.

In a still further alternative embodiment, the controller may set the supply fuel mass flow to the fuel processing system in dependence on the intrinsic consumption of hydrogen-rich gas in the fuel processing system.

Many specific details of certain embodiments of the invention are set forth in the detailed description below to provide a thorough understanding of such embodiments. One skilled in the art, however, will understand that the present invention may have additional embodiments, or may be practiced without several of the details described.

BRIEF DESCRIPTION OF THE DRAWING(S)

DETAILED DESCRIPTION OF PREFERRED EMBODIMENT(S)

For the generation of electrical energy, a hydrogen-rich gas and an oxidant stream are supplied to a fuel cell through different supply lines. In fuel cell systems that are operated with a reformer, the supply line for supplying a hydrogen-rich gas typically includes a fuel processing system with a reformer, in which a hydrogen-rich reformate stream is produced, and typically other fuel processing and/or gas purification equipment, while the supply line for supplying an oxidant stream includes a separate oxidant supply system. This system for supplying oxidant stream usually includes a compressor to control the mass flow of the oxidant stream. In the method according to the invention, these two supply lines can be operated inter-dependently. This means that when supplying oxidant stream, the system can take into account the dynamic response or possible delays of the fuel processing system, and that the hydrogen-rich gas can be supplied in dependence on the dynamic response or possible delays of the system for supplying oxidant stream. This option for the supply paths to influence each other improves the regulation of the output of the fuel cell system and thus improves the manner in which the overall fuel cell system provides the desired power output.

Hydrogen-rich gas is produced in the fuel processing system from a supply fuel that usually contains a carbon- and hydrogen-rich medium, such as for example methanol. The consumption and loss of hydrogen-rich gas in the fuel processing itself and the efficiency of the fuel processing system can be taken into account when determining the required supply fuel quantity. This results in a more accurate determination of the required quantity of supply fuel to be delivered to the fuel processor, and thus in a more precise output regulation.

Figure 1:
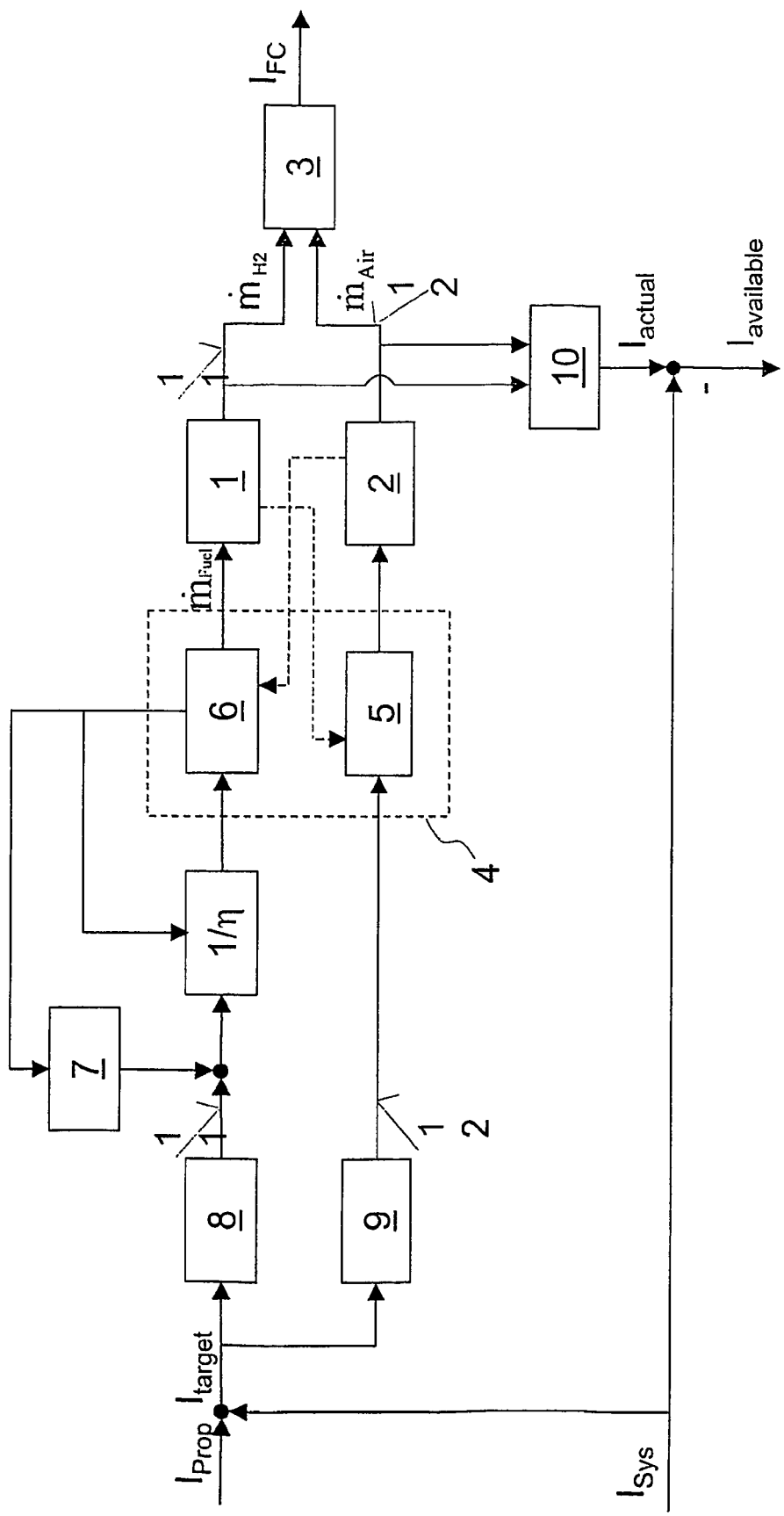
FIG. 1 shows a block diagram illustrating a method and apparatus for regulating the electrical power output of a fuel cell system according to the invention.

What follows is a more detailed description, with the help of FIG. 1, of a method and apparatus for regulating the electrical power output of a fuel cell system according to the invention. The method and apparatus are particularly applicable when the fuel cell system comprises a fuel processing system 1 to provide a hydrogen-rich medium or gas, in addition to a system 2 for supplying an oxidant stream, and a fuel cell 3 to supply power to electrical loads. However, the method and apparatus are also applicable in a fuel cell system which does not have a fuel processor, in which a hydrogen-rich gas (for example, substantially pure hydrogen) is supplied from a hydrogen storage tank or medium. The fuel cell 3 is thus supplied with a hydrogen-rich stream (for example, a reformate stream or pure hydrogen) and an oxidant stream for example an oxygen-rich gas, such as air. Hydrogen-rich gas is typically produced from a supply fuel in a reformer (not shown) of the fuel processing system 1. This supply fuel may contain alcohols, ethers, esters, hydrocarbons, such as for example natural gas or gasoline, and/or any other medium that can be used to produce hydrogen for the operation of a fuel cell system. The preferred supply fuel is methanol. The system 2 for supplying the oxidant stream comprises a compressor (which is not shown) to set the mass flow of the oxidant stream $\dot{m}_{Air}$. The compressor is a parasitic electrical load that is provided with current $I_{Sys}$ by fuel cell 3. The fuel cell system contains a controller 4 to adjust the mass flow of the supply fuel $\dot{m}_{Fuel}$ directed to fuel processing system 1 and to adjust the mass flow of the oxidant stream $\dot{m}_{Air}$ directed to fuel cell 3. In the signal flow paths that are associated with the hydrogen-rich gas and the oxidant stream, the controller 4 is located upstream of the fuel processing system 1 and upstream of the system 2 for supplying the oxidant stream. In an advantageous manner, an arithmetic unit 8 is located upstream of the controller 4 in the signal flow path 11, and uses the current or power demand $I_{target}$ to generate a target value for the supply fuel quantity to be metered, or for the supply fuel mass flow $\dot{m}_{Fuel}$. Analogously, an arithmetic unit 9 is located upstream of the controller 4 in the signal flow path 12, and uses the current demand or power demand $I_{target}$ to generate a target value for the speed of the compressor (not shown) or for the mass flow of the oxidant stream $\dot{m}_{Air}$. The controller 4 can be integrated in a control device. Alternatively, the areas of the controller 4 that are only associated with one signal flow path 11, 12, may be integrated in separate control devices that are associated exclusively with the signal flow paths 11, 12.

In accordance with the invention, the mass flow of the oxidant stream $\dot{m}_{Air}$ directed to fuel cell 3 can be adjusted in dependence on the dynamic response of the fuel processing system 1. By dynamic response of a system it is understood that a fundamental characteristic of the system is that its response is time-dependent. If the system can be represented by a differential equation or a difference equation, then this equation can describe its dynamic behaviour. For example, in a linear differential equation, the eigenvalues and the eigenvectors determine the transient response of the system. The transient response is characterised by possible time delays, a certain damping, possible overshoots, etc. Dead times are also a part of the dynamic response of a system.

Controller 4 contains a first filter unit 5, which is arranged in signal flow path 12. The parameters of filter unit 5 can be adjusted in dependence on the dynamic response of fuel processing system 1 (dot-dash arrow linking elements 1 and 5). The parameters can either be set using a simulation model of fuel processing system 1, and/or using measured values and/or calculated values of the mass flow of the hydrogen-rich gas $\dot{m}_{H2}$, since these values are also dependent on the dynamic response of fuel processing system 1. The term simulation model refers to a mathematical and/or physical model of a system. A physical model can be obtained by describing the system using appropriate physical laws. A mathematical model can be obtained by measuring the input and output quantities of the system and by approximating the response of the system with the help of these measured quantities, for example, using the method of least squares known in the literature.

Mathematical models that are suitable for this are, for example, linear and non-linear differential equations or difference equations, performance characteristics maps, neural networks, the ARX model known from the English-language literature (autoregressive model with exogenous input variables), etc. The simulation model or the parameters of the simulation model can be generated prior to using the system or during the operation of the system and can be adjusted after certain time intervals to match the actual system behaviour (adaptive modelling or identification). Adaptive modelling makes it possible to integrate effects such as ageing or changed operating points into the simulation model.

Normally, fuel processing system 1 is characterised by a dynamic response that is slower than that of system 2 for supplying the oxidant stream, since the dynamic response of the latter is predominantly determined by the dynamic response of the air supply compressor (not shown), which usually is characterised by a comparatively rapid dynamic behaviour. In order to be able to introduce into fuel cell 3 the required amount of oxidant stream at the same time, and not prior to, as the corresponding amount of hydrogen-rich gas, for example during a load change, filter unit 5 preferably contains a proportional controller with a selectable order time delay or a selectable order time delay element (a so-called $PT_x$ element). The parameters of the time delay element, such as the time constants and the amplification factor, and the ordinal number, can then be chosen in dependence on the dynamic behaviour of the fuel processing system 1. Preferably, one uses a second order time delay element ($PT_2$).

The supply fuel mass flow $\dot{m}_{Fuel}$ can also be adjusted in dependence on the dynamic response of the system 2 for supplying the oxidant stream. The controller 4 is equipped with a second filter unit 6, which is arranged in the signal flow path 11. The parameters of this second filter unit 6 can be set in dependence on the dynamic behaviour of the system 2 for supplying the oxidant stream (dashed arrow linking elements 2 and 6).

The parameters can be adjusted using the simulation model for system 2 for supplying the oxidant stream and/or using measured and/or calculated values of the mass flow of the oxidant stream $\dot{m}_{Air}$, since these values also are dependent on the dynamic response of the supply system 2. Should fuel processing system 1 possess a faster dynamic response than system 2 for supplying the oxidant stream or the compressor (not shown), then second filter unit 6 preferably contains a proportional controller with a time delay of any desired order or a selectable order time delay element (as a so-called $PT_x$ element). The parameters of the time delay element, such as the time constants and the amplification factor, and the ordinal number, can then be chosen in dependence on the dynamic behaviour of the system 2 for supplying the oxidant stream or of the compressor (not shown).

Figure 2:
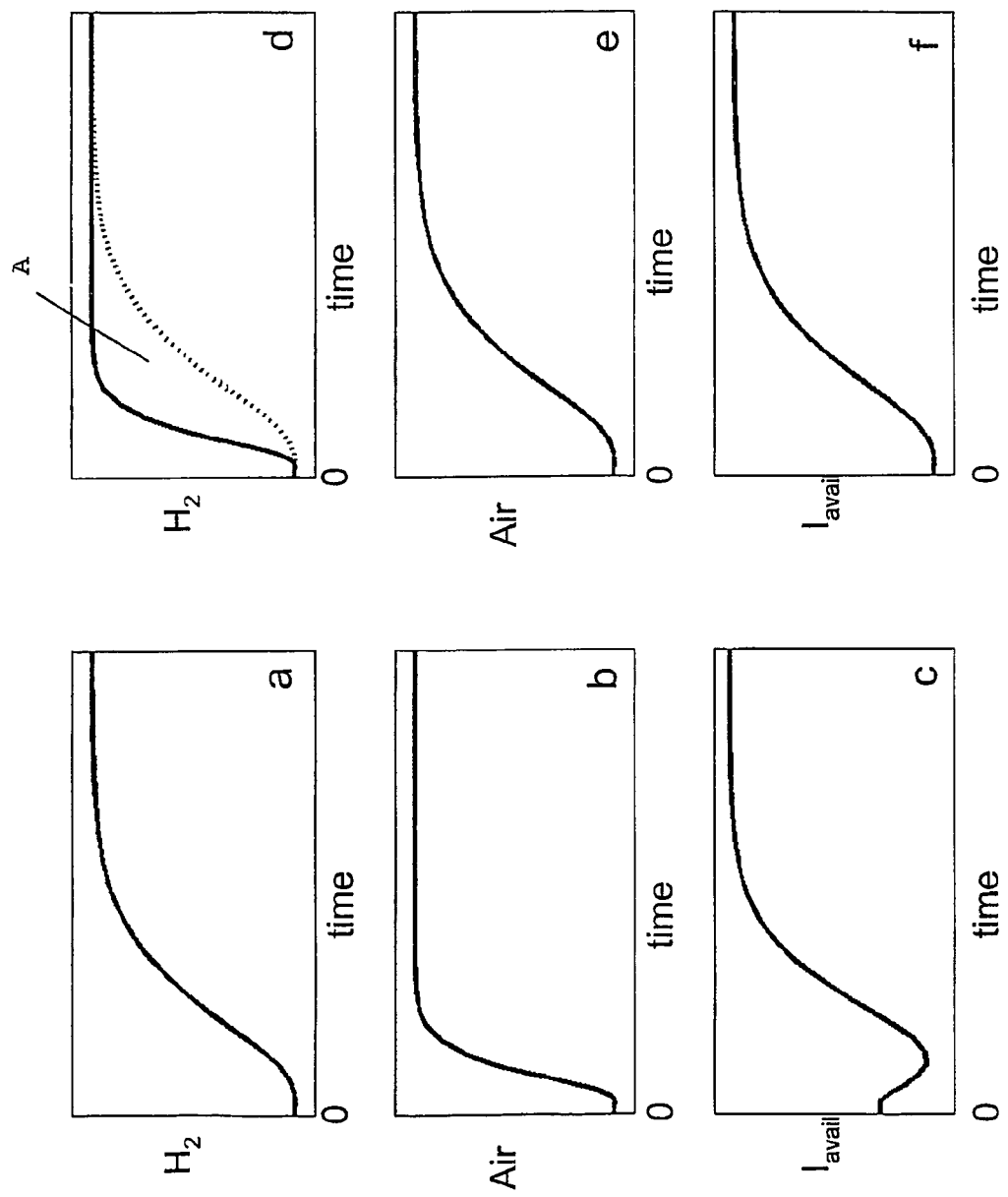
FIG. 2 shows in diagrams a, b, c, d, e, and f as a function of time, the mass flow of a hydrogen-rich gas, the mass flow of an oxidant stream, and the output current of a fuel cell system that is operated without using the method and apparatus according to the invention.

FIG. 2 shows curves for the operation of a fuel cell system in two cases where the air mass flow and the hydrogen-rich gas mass flow are not coordinated or interdependent. FIGS. 2a-c illustrate an example of the step responses of hydrogen mass flow (diagram a), air mass flow (diagram b), and current $I_{available}$ (diagram c), as a function of time and in response to a sudden increase in current demand $I_{target}$ at time zero, wherein the increased air mass flow is supplied to the fuel cell 3 earlier than the increased hydrogen mass flow. The current $I_{available}$ is the current $I_{actual}$ that can be produced by fuel cell 3 minus a current $I_{Sys}$, which is consumed by auxiliary equipment (parasitic loads), such as the compressor, a high-pressure compressor of the fuel processing system, or an air conditioning system. This means that $I_{available}$ represents the current that is available to power an external load, for example, for the propulsion of a vehicle. The step response of the hydrogen mass flow and the air mass flow are representative of the step responses of the mass flows of a hydrogen-rich and an oxidant stream $\dot{m}_{H2}, \dot{m}_{Air}$.

If there is a sudden power demand on the fuel cell system, the step response of the hydrogen mass flow increases slowly until it reaches the steady-state final value (diagram a). The step response of the air mass flow reaches its steady-state limiting value much earlier, i.e. it has a higher rate of increase (diagram b). Consequently, during the rise time of the hydrogen mass flow, the current $I_{available}$ at first drops significantly and subsequently increases until it reaches its steady-state limiting value (diagram c). A comparison of diagrams a, b, and c shows that an unwanted current dip—due to the increased power demand of the compressor ($I_{Sys}$), which arises too early—can occur during the time interval during which the fuel cell is supplied with an increased quantity of air before hydrogen. This state can arise if the compressor is activated to increase its output too early or if the compressor speed is too high.

FIGS. 2d-f illustrate an example of the step responses of hydrogen mass flow (diagram d), air mass flow (diagram e), and current $I_{available}$ (diagram f), as a function of time. Solid lines represent the values that are the result of a sudden increase in current demand $I_{target}$ at time zero if the hydrogen mass flow is supplied to the fuel cell earlier than the air mass flow. The step responses of the hydrogen mass flow and the air mass flow are representative of the step responses of the mass flows of a hydrogen-rich and an oxidant stream $\dot{m}_{H2}, \dot{m}_{Air}$. In this case (diagram d), before reaching its steady-state limiting value, the step response of the hydrogen mass flow rises faster than in diagram a. The step response of the air mass flow reaches its steady-state limiting value at a later time, i.e. it increases more slowly (diagram e). The behaviour of the current $I_{available}$ corresponds to that of the air mass flow (diagram f).

The dotted line in diagram d shows the behaviour of a hydrogen mass flow, were it to correspond to the behaviour of the air mass flow shown in diagram e. A comparison of diagram d with diagram e shows that the increased hydrogen mass flow is made available to the fuel cell 3 earlier than the increased air mass flow. This state can arise if the compressor is activated late or if the compressor speed is too low. The area A between the solid line and the dotted line in diagram d is an indication of the unutilized dynamic response of the fuel processing system 1. The increased supply of hydrogen or of a hydrogen-rich gas—in comparison to the supply of air or an oxidant stream—can lead to overheating of a catalytic burner (if present), which usually is connected downstream of the fuel cell 3 to combust hydrogen contained in the fuel cell exhaust gas. It can also result in decreased fuel efficiency.

Taking into account the dynamic response of the fuel processing system 1 when supplying the oxidant stream and taking into account the dynamic response of the system 2 for supplying the oxidant stream or that of the compressor (not shown) when supplying supply fuel to the fuel processing system 1, makes it possible to synchronize or co-ordinate the supply of hydrogen-rich gas and the supply of the oxidant stream to the fuel cell unit, i.e. the appropriate volumes or mass flows of the two reactants required by the load are supplied to the fuel cell simultaneously. This results in a rapid, reliable, and safe supply of power and prevents unwanted current-and/or voltage dips, or unnecessary thermal loads on other system components, such as a catalytic burner.

In a further embodiment of the invention, measured and/or calculated values of the mass flow of the hydrogen-rich gas $\dot{m}_{H2}$ are provided to the controller 4 as additional input variables.

Furthermore, measured and/or calculated values of the mass flow of the oxidant stream $\dot{m}_{Air}$ can be provided to the controller 4 as well. Preferably, the controller contains a multi-variable controller, which uses as input variables the current demand $I_{target}$ or a target value for the amount of supply fuel and a target value for the compressor speed, and which uses as controlled variables the mass flows of the hydrogen-rich gas $\dot{m}_{H2}$ and of the oxidant stream $\dot{m}_{Air}$, and which uses as manipulated variable the metering of the supply fuel quantity and the activation of the compressor. In order to be able to implement the current demand $I_{target}$ as accurately as possible, the filter unit 6 can contain a proportional controller or a proportional controller with derivative action to compensate for the slow dynamic response of the fuel processing system. Preferably, the transfer function of the proportional controller with derivative action is given by the Laplace Transform equation $$K \cdot \left(1 + \frac{T_v \cdot s}{1 + T_1 \cdot s}\right)$$

whereby s is a complex variable. K is an amplification factor, and $T_V$ and $T_1$ are time constants of the proportional controller with derivative action, with the usual relation $T_1+T_V>T_1$. The value of the amplification factor is preferably equal to 1.

Figure 3:
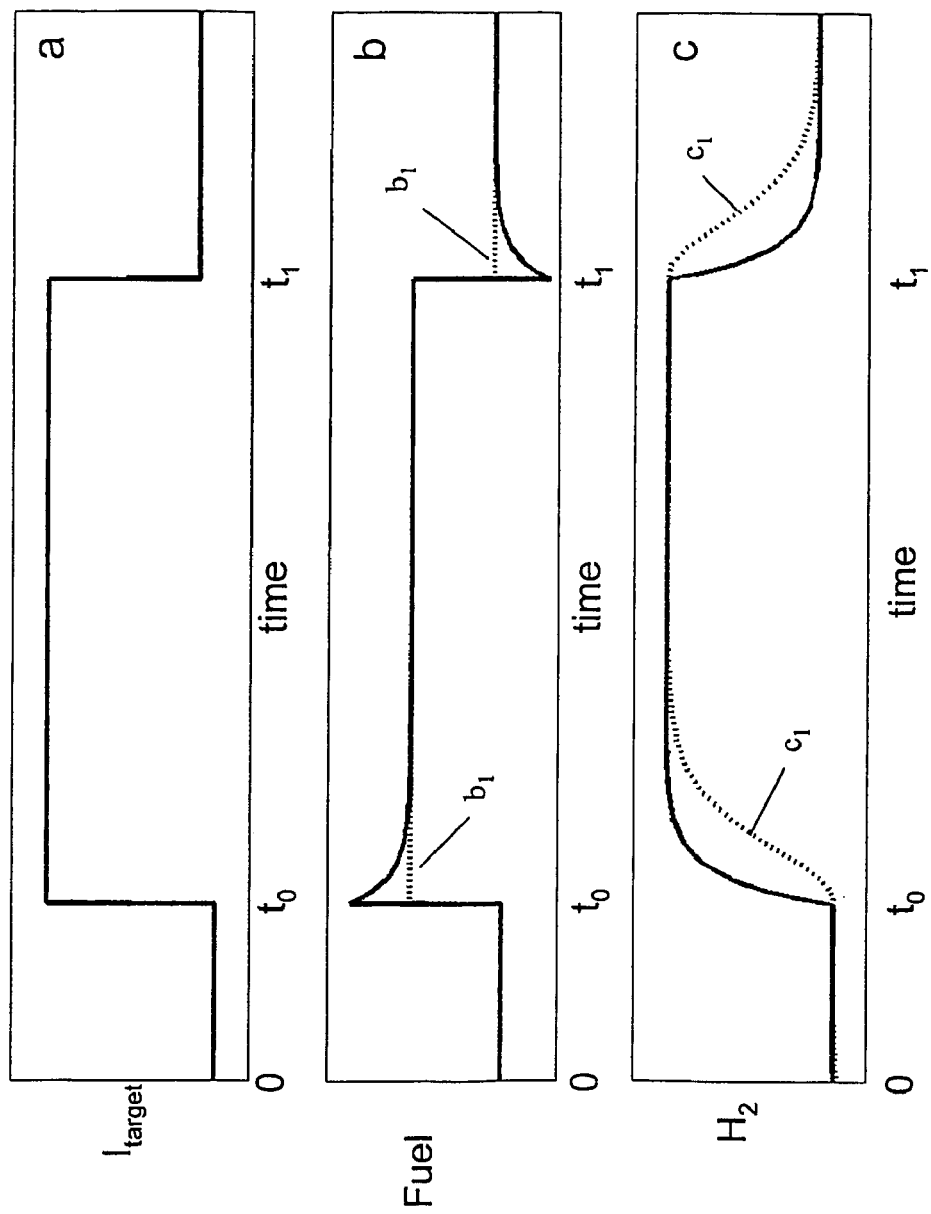
FIG. 3 shows in diagrams a, b, and c as a function of time, the current demand, the mass flow of a supply fuel, and the mass flow of a hydrogen-rich gas in a fuel cell system, with a proportional controller with derivative action in the supply branch for the hydrogen-rich gas.

FIG. 3 shows the current demand $I_{target}$ (diagram a), the supply fuel mass flow $\dot{m}_{Fuel}$ (diagram b), and the mass flow of the hydrogen-rich gas $\dot{m}_{H2}$ (diagram c), as a function of time. The solid lines represent the signal in the case when a proportional controller with derivative action is used (as in an embodiment of the present invention), while the dotted lines represent the signal resulting when such a proportional controller with derivative action is not used.

The current demand that is shown in diagram a of FIG. 3 has the shape of a step function, which rises suddenly at time $t_0$ and returns to its original value at time $t_1$. Diagram b shows the supply fuel mass flow $\dot{m}_{Fuel}$ as a function of time, which typically results from the change in current demand $I_{target}$ shown in diagram a. If a proportional controller with derivative action is used, then the supply fuel mass flow $\dot{m}_{Fuel}$ increases suddenly at time to and then drops exponentially to its steady-state final value, which is normally reached in the time interval $t_0<t<t_1$, whereby the value of the supply fuel mass flow $\dot{m}_{Fuel}$ at time $t_0$ is larger than the steady-state final value. In the remainder of this description, this phenomenon will be referred to as overshoot. Time is represented by the variable t. When $I_{target}$ is decreased at time $t_1$, the supply fuel mass flow $\dot{m}_{Fuel}$ drops suddenly at time $t_1$ and then rises exponentially to its steady-state final value, which is normally reached at $t>t_1$, whereby the value of the supply fuel mass flow $\dot{m}_{Fuel}$ at time to is smaller than the steady-state final value (solid line). If no proportional controller with derivative action is used, then the behaviour of the supply fuel mass flow $\dot{m}_{Fuel}$ is analogous to that of the current demand $I_{target}$. This is to say that at time $t_0$ the supply fuel mass flow increases suddenly and suddenly returns to its original value at time $t_1$ (dotted line $b_1$). Diagram c shows the resulting step response of the mass flow of the hydrogen-rich gas $\dot{m}_{H2}$.

If a proportional controller with derivative action is used, then the mass flow of the hydrogen-rich gas $\dot{m}_{H2}$ usually rises exponentially at time to until it reaches its steady-state final value, and subsequently at time $t_1$ drops exponentially back to its original value (solid line). If no proportional controller with derivative action is used then the mass flow of the hydrogen-rich gas behaves identically, but it takes longer to reach the final value after $t_0$ or the original value after $t_1$, i.e. the transient response times are longer (dotted line $c_1$).

This means that if a proportional controller with derivative action is present, the mass flow of the hydrogen-rich gas $\dot{m}_{H2}$ reacts more rapidly to changes of the current demand $I_{target}$ or the supply fuel mass flow $\dot{m}_{Fuel}$. The higher the overshoot during the metering of the supply fuel, the faster the required quantity of hydrogen-rich gas can be provided for the fuel cell 3. A large overshoot with a short transient response time is practical. The choice of the time constants $T_V$ and $T_1$ influences the shape, the amplitude and/or the width of the overshoot of the supply fuel curve. This is a result of the fact that the step response and the transfer function are related to each other by the Inverse Laplace Transform equation. Thus, the amplitude and/or width can be chosen, but this choice is limited by parasitic delays and/or component limits.

Since the fuel processing system 1 usually possesses a slower dynamic response than the system 2 for supplying the oxidant stream, it is of advantage to integrate a proportional controller with derivative action into the filter unit 6, and to also include a time delay element into the filter unit 5. This compensates for a time delay of the fuel processing system 1 in the signal flow path 11 and balances the more rapid response characteristics of the system 2 for supplying the oxidant stream.

In a further embodiment of the invention, it is possible to take into account—for the setting of the supply fuel mass flow $\dot{m}_{Fuel}$—an efficiency η of the reformer (not shown) or of the entire fuel processing system 1, and/or the intrinsic consumption of hydrogen-rich gas by the fuel processing system 1 itself. This intrinsic consumption of hydrogen-rich gas is typically the result of one or more gas purification stages, which are usually located down-stream of the reformer.

Because for purposes of gas purification one typically supplies a larger amount of an oxidant stream, such as air, than is actually required, so as to be able to reduce the concentration of CO (carbon monoxide) in the reformate stream, a loss of hydrogen-rich gas in the fuel processing system 1 occurs as a consequence. This can be taken into account as intrinsic consumption for supply fuel metering purposes. The added oxygen-rich gas is referred to as AD, i.e. air dosage. The intrinsic consumption and efficiency η usually depend on the amount of supply fuel dosage or on the supply fuel mass flow $\dot{m}_{Fuel}$. The air dosage AD and the efficiency η can preferably be determined by using performance characteristic maps, which use as their input variables the supply fuel dosage or the supply fuel mass flow $\dot{m}_{Fuel}$. With the help of Faraday's laws, it is possible to use the current demand $I_{target}$ and the air dosage AD to calculate the required mass flow of hydrogen-rich gas $\dot{m}_{H2}$, from which one can calculate the supply fuel mass flow $\dot{m}_{Fuel}$ to be set by means of the following equation $$\dot{m}_{Fuel} = M_{Fuel} \cdot \frac{1}{K} \cdot \frac{1}{\eta} \cdot \left(\frac{\lambda_{H2}^{FC} \cdot n_z}{F \cdot z} \cdot I_{target} + \frac{2 \cdot 0.21}{V_0} \cdot AD\right),$$

whereby $M_{Fuel}$ is the molar mass of the supply fuel, n is the number of fuel cells in the fuel cell unit, z is the valency of hydrogen (z=2), $V_0$ is the normal volume or molar volume of oxygen, and F is Faraday's constant. $\lambda_{H2}^{FC}$ represents the stoichiometric coefficient of hydrogen in the reaction equation $$\lambda_{H2}^{FC} \cdot H_2 + \frac{1}{2} \cdot \lambda_{O2}^{FC} \cdot O_2 \rightarrow H_2O + (\lambda_{H2}^{FC} - 1) \cdot H_2 + \frac{1}{2} \cdot (\lambda_{O2}^{FC} - 1) \cdot O_2$$

and $\lambda_{O2}^{FC}$ represents the stoichiometric coefficient of oxygen in the above reaction equation.

The number 2 appears in the numerator of the second term inside the brackets because the fuel cell requires two hydrogen molecules $H_2$ for each oxygen molecule $O_2$ for the reaction to occur. The number 0.21, which also appears in the numerator of the second term inside the brackets, represents the percentage of oxygen in air.

The factor k indicates how many moles of the hydrogen-rich gas can be produced with one mole of supply fuel in an ideal fuel processing system with η equal to 100%. For example, if methanol is used as supply fuel, it is possible to produce 3 moles of hydrogen and k equals 3. Taking into account the efficiency η and the air dosage AD of the fuel processing system 1 the reformer (not shown) allows a more accurate dosage of supply fuel, which results in a more accurate dosage of the hydrogen-rich gas. Block 7 in FIG. 1 represents the effect of the air dosage AD on the dosage of the hydrogen-rich gas.

In a further embodiment of the invention, output current $I_{actual}$ is determined from the mass flow of the hydrogen-rich gas $\dot{m}_{H2}$ and the mass flow of the oxidant stream $\dot{m}_{Air}$ by means of a simulation model 10 that is based on the fuel cell 3. The output current $I_{actual}$ represents the maximum current that may be requested or consumed by the loads. The output current $I_{actual}$ is the instantaneous current that the fuel cell 3 can provide. In contrast, the actual measurable output current of the fuel cell unit, $I_{FC}$, represents the current that is actually required and drawn by the loads. The simulation model can, for example, be a proportional controller with a time delay of any desired order or a time delay element of any desired order (a so-called $PT_x$ element).

In a further embodiment of the invention, output current $I_{actual}$ is determined from the current demand $I_{target}$ by means of a second simulation model (not shown), which is based on the fuel cell 3, the fuel processing system 1, and the system 2 for supplying the oxidant stream. In this case as well, the output current $I_{actual}$ represents the maximum current that can be requested or consumed by the loads.

The output current $I_{actual}$ is the instantaneous current that the fuel cell 3 can provide. This simulation model can for example be a proportional controller with a time delay of any desired order or a time delay element of any desired order (a so-called $PT_x$ element), preferably a fourth order time delay element ($PT_4$ element).

The use of simulation models to calculate the output current $I_{actual}$ eliminates the need to use potentially expensive sensors in the fuel cell system. Moreover, the above-described simulation models provide noise-free signals as output signals. A suitable choice of appropriate simulation models makes it possible to represent the above-mentioned subsystems of the fuel cell system, e.g. the fuel cell 3, with any desired accuracy.

It would be useful, if in a mobile device, such as a fuel cell vehicle, it would be possible to distinguish between the current that is required for the propulsion of the vehicle and the current that is needed for other electrical systems or loads that are integrated into the vehicle, such as for example the compressor, a high-pressure compressor of the fuel processing system, or an air conditioning system. The electrical parasitic loads also include loads in the vehicle electrical system, such as in a 12V or a 42V vehicle electrical system. For improved clarity, the first-mentioned current will be referred to as $I_{Prop}$, while the latter current will be referred to as $I_{Sys}$. The current demand $I_{target}$ can be calculated as the sum of $I_{Prop}$ and $I_{Sys}$. From the current that has been measured and/or simulated or calculated with the help of the above-mentioned simulation models one can determine—taking into account the current consumption $I_{Sys}$ of the other electrical loads—an available current $I_{available}$, which—in the case of a vehicular application—is available for the propulsion of the vehicle by means of an electric motor. This allows a rapid and precise control of the required current $I_{Prop}$.

The principles disclosed herein apply to a sudden increase in current demand as well as to sudden current reduction in current demand, such as when the fuel cell system is shut down. In such a case, the fuel processing system 1 is typically not as quick in stopping the production of hydrogen-rich gas, when compared to the system 2 stopping the supply of oxidant stream. As outlined previously, the increased supply of the hydrogen-rich gas (when compared to the oxidant stream) can lead to overheating of a catalytic burner located downstream of the fuel cell 3. The parameters of the time delay element could therefore vary depending on whether the sudden load change is negative or positive. For example, the parameters of filter unit 5 could be selected to protect a downstream catalytic burner from overheating during shutdown.

While particular elements, embodiments and applications of the present method and apparatus have been shown and described herein, it will be understood, of course, that the invention is not limited thereto since modifications may be made by those skilled in the art, particularly in light of the foregoing teachings.

It is therefore contemplated by the appended claims to cover such modifications as incorporate those features which come within the scope of the invention.

What is claimed is:

1. A method of operating a fuel cell system comprising a fuel cell (3) with an anode stream passage and a cathode stream passage, an anode supply system (1) for supplying a hydrogen-rich gas to the anode stream passage, a cathode supply system (2) for supplying an oxidant stream to the cathode stream passage and a controller (4) for operating the anode and cathode supply systems (1, 2), the method comprising operating one supply system in dependence on the dynamic response of the other supply system, characterized in that the fuel cell system comprises a fuel processing system (1) for converting a supply fuel into a hydrogen-rich gas wherein the supply fuel mass flow ($m_{Fuel}$) to the fuel processing system (1) is set in dependence on the dynamic response of the cathode supply system (2).

2. The method of claim 1, wherein the hydrogen-rich gas mass-flow ($m_{H2}$) to the anode stream passage is set in dependence on the dynamic response of the cathode supply system (2).

3. The method of claim 1, wherein the oxidant stream mass flow ($m_{Air}$) to the cathode stream passage is set in dependence on the dynamic response of the anode supply system (1).

4. The method of claim 1, wherein the oxidant stream mass flow ($m_{H2}$) to the cathode stream passage is set in dependence on the dynamic response of the fuel processing system (1).

5. The method of claim 1, wherein the supply fuel mass flow ($m_{Fuel}$) to the fuel processing system is set in dependence on the efficiency of the fuel processing system (1).

6. The method of claim 1, wherein the supply fuel mass flow ($m_{Fuel}$) to the fuel processing system (1) is set in dependence on the intrinsic consumption of hydrogen-rich gas in the fuel processing system (1).

7. A fuel cell system comprising: a) a fuel cell (3) comprising an anode stream passage and a cathode stream passage; b) an anode supply system (1) for supplying a hydrogen-rich gas to the anode stream passage; c) a cathode supply system (2) for supplying an oxidant, stream to the cathode stream passage; d) a controller (4) for operating one supply system (1, 2) in dependence on the dynamic response of the other supply system (2, 1) characterized in that the anode supply system, comprises a fuel processing system (1) for converting a supply fuel into a hydrogen-rich gas wherein the controller (4) sets the hydrogen-rich gas mass flow ($m_{H2}$) to the anode stream passage in dependence on the dynamic response of the cathode supply system (2), wherein the controller (4) sets the supply fuel mass flow ($m_{Fuel}$) to the fuel processing system (1) in dependence on the dynamic response of the cathode supply system (2).

8. A fuel cell system comprising: a) a fuel cell (3) comprising an anode stream passage and a cathode stream passage; b) an anode supply system (1) for supplying a hydrogen-rich gas to the anode stream passage; c) a cathode supply system (2) for supplying an oxidant, stream to the cathode stream passage; d) a controller (4) for operating one supply system (1, 2) in dependence on the dynamic response of the other supply system (2, 1) characterized in that the anode supply system, comprises a fuel processing system (1) for converting a supply fuel into a hydrogen-rich gas wherein the controller (4) sets the hydrogen-rich gas mass flow ($m_{H2}$) to the anode stream passage in dependence on the dynamic response of the cathode supply system (2), wherein the controller (4) sets the supply fuel mass flow ($m_{Fuel}$) to the fuel processing system (1) in dependence on the efficiency ($\eta$) of the fuel processing system (1).

9. A fuel cell system comprising: a) a fuel cell (3) comprising an anode stream passage and a cathode stream passage; b) an anode supply system (1) for supplying a hydrogen-rich gas to the anode stream passage; c) a cathode supply system (2) for supplying an oxidant, stream to the cathode stream passage; d) a controller (4) for operating one supply system (1, 2) in dependence on the dynamic response of the other supply system (2, 1) characterized in that the anode supply system, comprises a fuel processing system (1) for converting a supply fuel into a hydrogen-rich gas wherein the controller (4) sets the hydrogen-rich gas mass flow ($m_{H2}$) to the anode stream passage in dependence on the dynamic response of the cathode supply system (2), wherein the controller (4) sets the supply fuel mass flow ($m_{Fuel}$) to the fuel processing system (1) in dependence on the intrinsic consumption of hydrogen-rich gas in the fuel processing system (1).

\* \* \* \* \*